United States Patent [19]

McGonigal et al.

[11] Patent Number: 5,012,048

[45] Date of Patent: Apr. 30, 1991

[54] POSITION INDICATING DEVICE

[75] Inventors: Stephen G. McGonigal, Hemel Hempstead; Lindsay MacDonald, Buzzard, both of Great Britain

[73] Assignee: Crosfield Electronics Limited, London, England

[21] Appl. No.: 369,393

[22] Filed: Jun. 20, 1989

[30] Foreign Application Priority Data

Jun. 21, 1988 [GB] United Kingdom ............... 8814735

[51] Int. Cl.⁵ ............................................ G08C 21/00
[52] U.S. Cl. ...................................... 178/18; 340/710
[58] Field of Search .................... 178/18, 19; 340/710; D14/114

[56] References Cited

U.S. PATENT DOCUMENTS 4,419,672 12/1983 Hird .
4,550,316 10/1985 Whetstone et al. ................. 340/710
4,581,761 4/1986 Ichinokawa et al. ............. 178/18 X

FOREIGN PATENT DOCUMENTS 0176842 4/1986 European Pat. Off. .

OTHER PUBLICATIONS

"Manual Digitizers for CAD", Nancy E. Rouse, Machine Design, Jun. 1985.

Primary Examiner—Stafford D. Schreyer
Attorney, Agent, or Firm—Sughrue, Mion, Zinn, Macpeak & Seas

[57] ABSTRACT

A manual position indicating device comprises a body portion (1) that can be moved by hand across a surface; and a support member (4) movably mounted to the body portion. The support member includes a graticule (13) and associated signal generating or detecting circuitry for interaction in use with position determining apparatus, whereby the relative positions of the graticule (13) and the body portion (1) are selected by suitably moving the support member and body portion relatively to one another. A cooperating ball (11) and notch system (10) is provided for locking the support member (4) relative to the body portion (1) in a number of different positions.

7 Claims, 6 Drawing Sheets

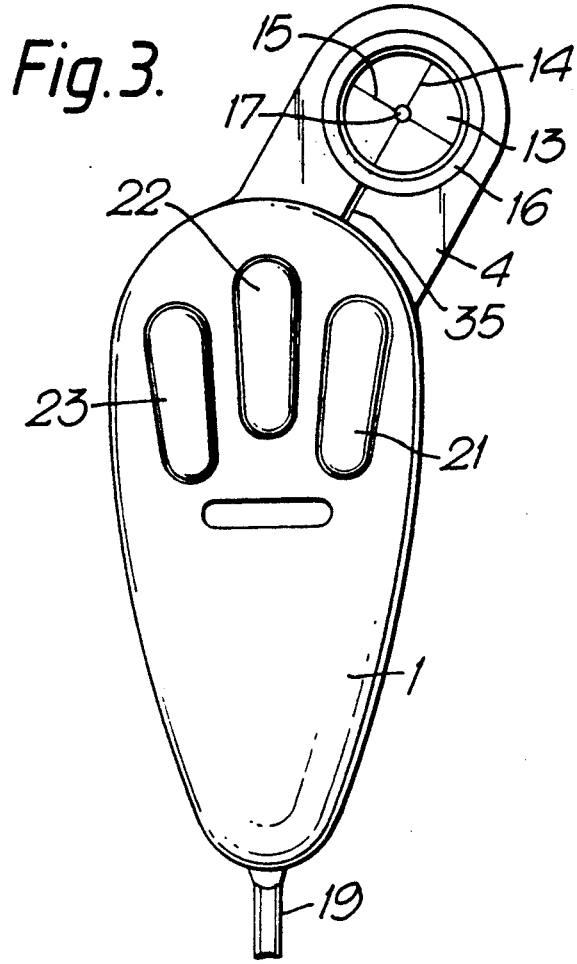
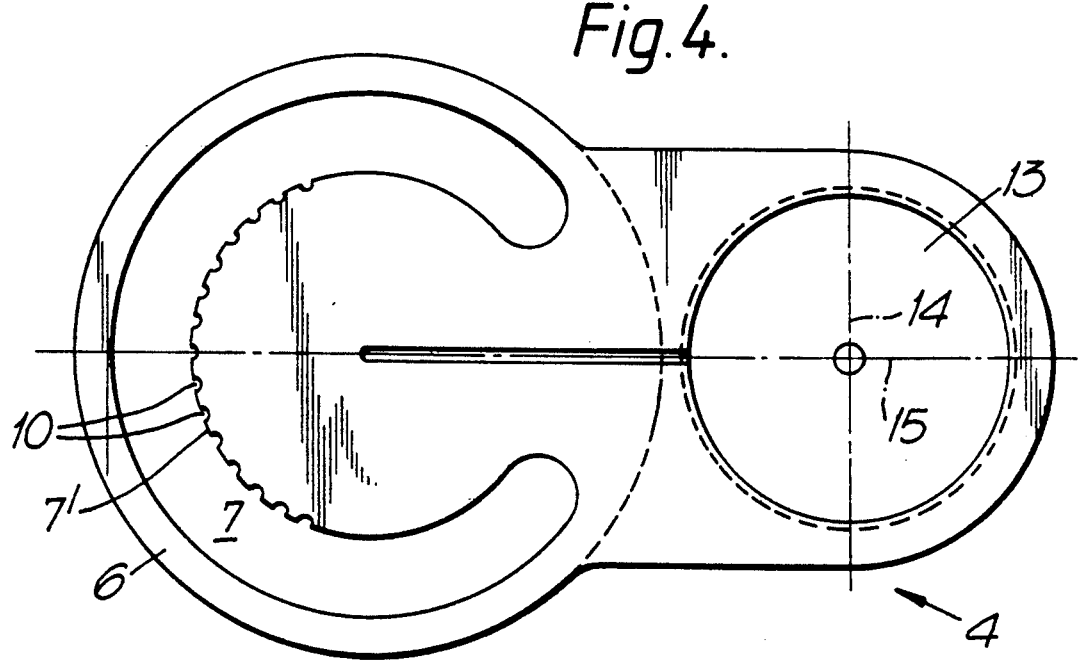

POSITION INDICATING DEVICE

FIELD OF THE INVENTION

The invention relates to a position indicating device.

DESCRIPTION OF A PRIOR ART

Digitising tablets are well known as means for entering two-dimensional coordinate information into a computer. A wide variety of such position-indicating apparatus has been developed over the past twenty years. In operation, the human operator typically moves a hand-held pointer over the plane surface of two orthogonal arrays of elongate sensing coils. Electro-magnetic coupling between each fixed array and a coil in the movable pointer is then used to detect the exact location of the pointer. Examples of such a position sensing apparatus are disclosed in GB-A-1,536,123 and U.S. Pat. No. 4,419,672.

The hand-held pointer can take various forms, most commonly either a stylus, held like a pen, or cursor, held flat on the surface. Cursor designs vary in size and shape, but typically have a body gripped between the operator's thumb and middle finger, one or more control buttons actuated by the index finger, and a crosshair target scribed on a glass graticule to facilitate accurate visual positioning of the pointer. Such an arrangement is disclosed in EP-A-176842.

The digitising tablet is commonly used in conjunction with a computer display screen to provide a means of interaction between a human operator and a computer system. The instructions from the operator to the computer typically consist of strings of coordinate pairs and button codes. According to the context, each coordinate may be decoded by the control software in the computer either as an XY coordinate position or as a command from a menu chart located at a known position on the digitising surface. Alternatively, movement of the hand-held pointer may generate a continuous stream of coordinates to control the movement of a graphical cursor on the display screen. This may be used to identify display coordinates or to select graphic objects or commands from a graphic menu. Such a visual interface method is disclosed in U.S. Pat. No. 4,692,858.

Known hand-held pointing devices suffer from a number of problems, which render them difficult to use. First, they do not take account of the natural asymmetry of the human hand, and thus fit both left-handed and right-handed operators equally poorly. Second, they do not provide physical support for the hand, leading to fatigue over long periods of operation. Third, they do not accommodate a full range of hand sizes, from the smallest female hand to the largest male hand, thereby forcing many operators to adopt unnatural grip configurations.

SUMMARY OF THE INVENTION

In accordance with one aspect of the present invention, a manual position indicating device comprises a body portion that can be moved by hand across a surface; and a support member movably mounted to the body portion, the support member including a graticule and associated signal generating or detecting means for interaction in use with position determining apparatus, whereby the relative positions of the graticule and the body portion are selected by suitably moving the support member and body portion relatively to one another and is characterised by locking means for locking the support member relative to the body portion in a number of different positions.

With this new arrangement, instead of mounting the graticule at a fixed position relative to the remainder of the device body, the graticule can be moved relative to the body portion. This increases considerably the flexibility of the device for different tasks and enables one device to be adapted for use by right and left-handed operators.

Preferably, the support is pivoted to the body portion so that it can swing to and fro in a lateral plane. This is particularly useful not only to enable the device to be used by both right and left handed people but also to enable the device to be adapted very easily for different functions. For example, the support member could be swung to one position when the device is to be used to select a menu function while it could be swung to a different position when the device is to be used for digitising the coordinates of selected positions.

Typically an angle of 20°-30° offset from the longitudinal axis of the body portion is preferred for pointing tasks, such as menu command selection, whereas an angle of 45°-60° is optimum for digitising tasks.

Other forms of movement, such as a sliding movement of the support member, or a side-to-side tilt of the body portion are also possible.

The locking means may comprise a cooperating ball and notch system, the ball preferably being coupled to the body portion while the notch system is mounted on the support member. Other forms of locking means are also suitable.

In one example, the body portion is provided with at least one control button for controlling a switch of the signal generating or detecting means. The function of this and additional control buttons, if provided, will be described in more detail below.

In another example, the support member is provided with at least one control button.

Another problem with conventional position indicating devices is that the control buttons are not conveniently placed for manual use.

In accordance with a second aspect of the present invention, a manual position indicating device comprises a body portion having a rear portion providing a smoothly rounded surface on which the palm of the operator's hand rests in use, and a number of elongate control buttons mounted on the body portion for controlling operation of the device, the buttons being positioned forward of the rear portion of the body portion and being located and shaped so as to lie under respective fingers of the operator's hand.

Preferably, the buttons are tapered and diverge towards the front of the indicating device. In a preferred example three buttons are provided with the central button offset forward of the adjacent buttons on each side.

The invention also envisages a manual position indicating device according to the invention coupled with position determining apparatus with which it cooperates to determine the position of the graticule; and processing means coupled with the device and the apparatus to which the determined position is comunicated.

A typical system in which this device could be incorporated is a computer aided design system or a page planning system such as our Crosfield "Studio" system.

BRIEF DESCRIPTION OF THE DRAWINGS

Two examples of a manual position indicating device and an image processing system incorporating such a device will now be described with reference to the accompanying drawings, in which:

FIG. 3 is a plan of the device illustrating the graticule in an alternative position;

FIG. 4 is an enlarged view of the support member for the graticule;

DETAILED DESCRIPTION OF THE EMBODIMENTS

Figure 1:
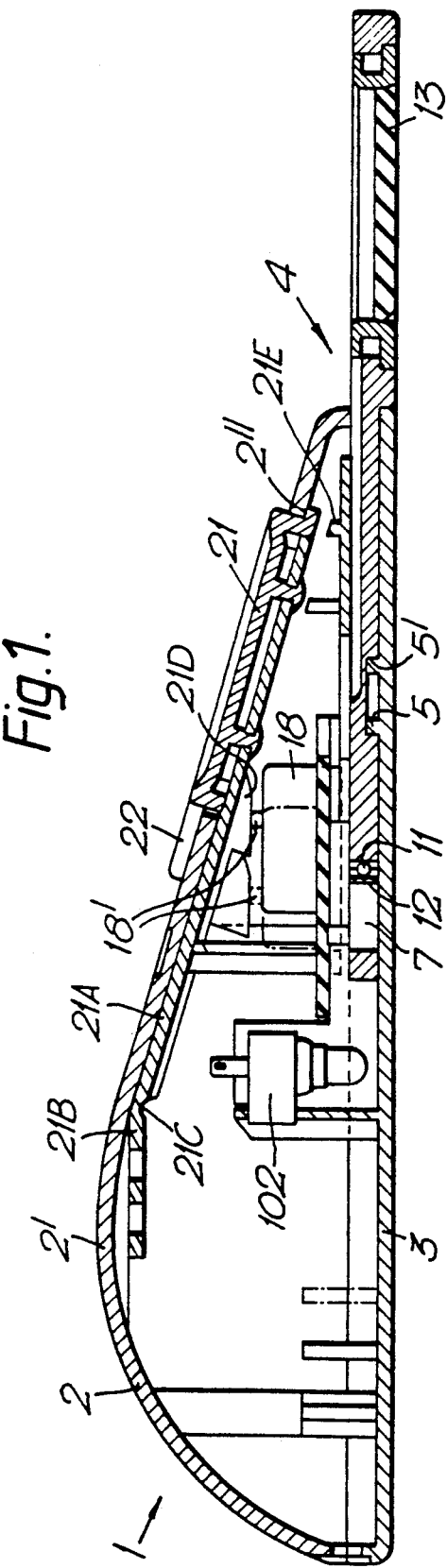
FIG. 1 is a schematic, longitudinal section through one example of an indicating device.

The position indicating device shown in the drawings comprises a body 1 formed by an upper, plastics portion 2 and a lower, plastics base portion 3. The upper portion 2 is shaped to fit neatly under a human hand with the palm of the hand resting on the highest part 2' of the upper portion 2. A recess 5' of a perspex graticule support member 4 is pivoted to a boss 5 of the lower portion 3 of the body 1 so as to be able to pivot laterally about the boss 5.

As can be seen in FIG. 4, the support member 4 has a rear section 6 having a generally C-shaped opening 7 in which is positioned a pair of bosses 8,9 (FIG. 2) secured to the base 3. The radially inner surface 7' of the opening 7 is formed with a series of substantially equally spaced notches 10. A leaf spring 12 is secured to the bosses 8, 9 and urges a ball 11 against the surface 7'.

When the support member 4 is located in position within the body 1 (FIGS. 1 and 2) the ball 11 is urged in a radially inward direction into engagement with the notches 10 but may be retracted from the notches by forcibly causing the support member 4 to pivot relative to the body 1 about the boss 5. In this way, the support member 4 can be swung from the position shown in FIGS. 1 and 2 to a number of alternative positions, for example that shown in FIG. 3.

The protruding end of the support member 4 supports a conventional graticule 13 comprising a glass disc on the underside of which are inscribed orthogonal cross-hairs 14, 15. Around the graticule is mounted an electrical coil 16 (FIG. 3) whose geometric centre is coincident with the point of intersection 17 between the cross-hairs 14, 15. The coil 16 is coupled by wires 35 to position sensing electronics in a controller.

A switch unit 18, includes three switches having respective spring loaded actuators 18' (two shown in FIG. 1), the three switches being actuated by respective press buttons 21-23. Each button 21-23 is fixed to a respective elongate plastics member (see member 21A in FIG. 1) which is secured at 21B to the upper portion 2 of the housing. The member 21A is notched at 21C to define a hinge about which the button 21 can pivot through an aperture 2" in the upper portion 2, a lower section 21D of the button engaging the actuator 18'. A spigot 21E defines a stop to limit movement of the button 21. Similar elements to 21B-21E are provided for the other switches. The switch unit 18 is coupled to a remote processing system 28 (FIG. 5) via a coupling 19 and a controller 33.

Figure 2:
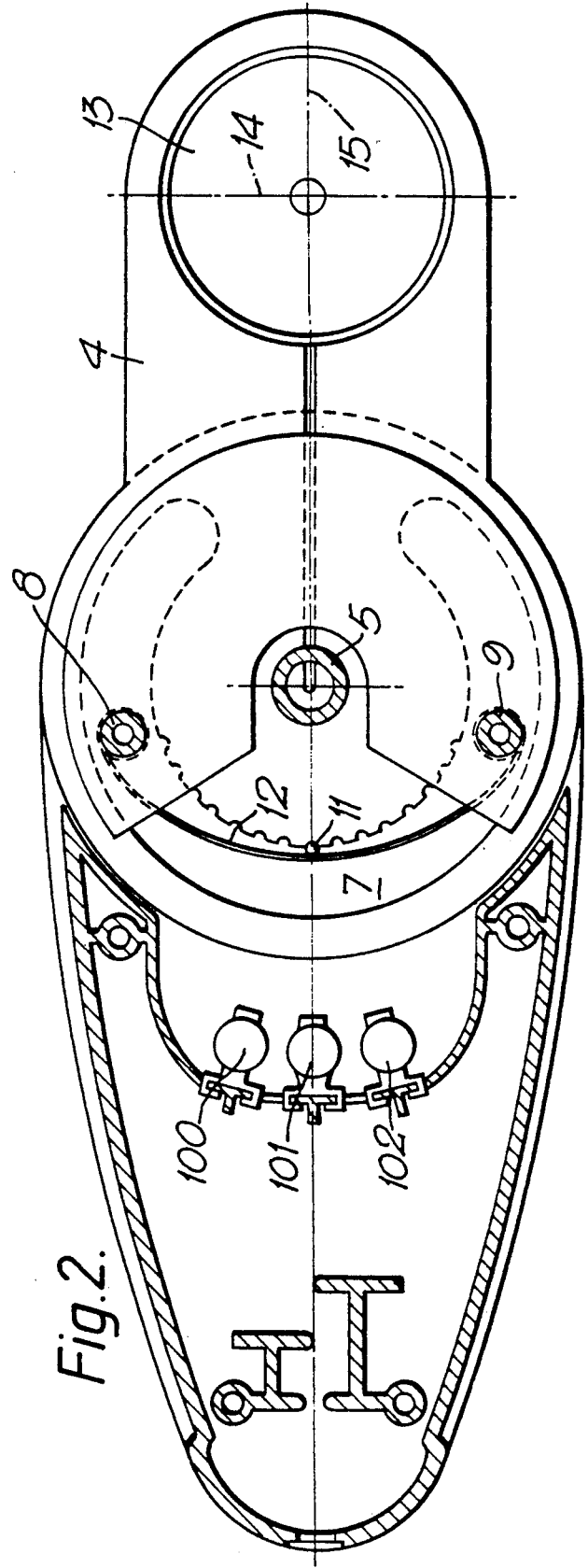
FIG. 2 is a schematic cross-section through the device shown in FIG. 1.

Three incandescent lights 100-102 are mounted to the base 3 of the body 1 (FIGS. 1 and 2). Light is coupled into the edge of the perspex support member 4 which acts as an optic channel to assist visibility of the region under the graticule 13.

The arrangement of the buttons in relation to the body of the device accommodates a wide range of hand sizes and allows the operator to actuate the buttons with the pads rather than the tips of the fingers. A degree of rapidity and sensitivity of button depressions can be achieved comparable to that involved in playing a musical instrument. The raised palm rest supports the hand in the same way that the raised arch of a shoe supports the foot, thereby reducing fatigue in prolonged operation.

Figure 6:
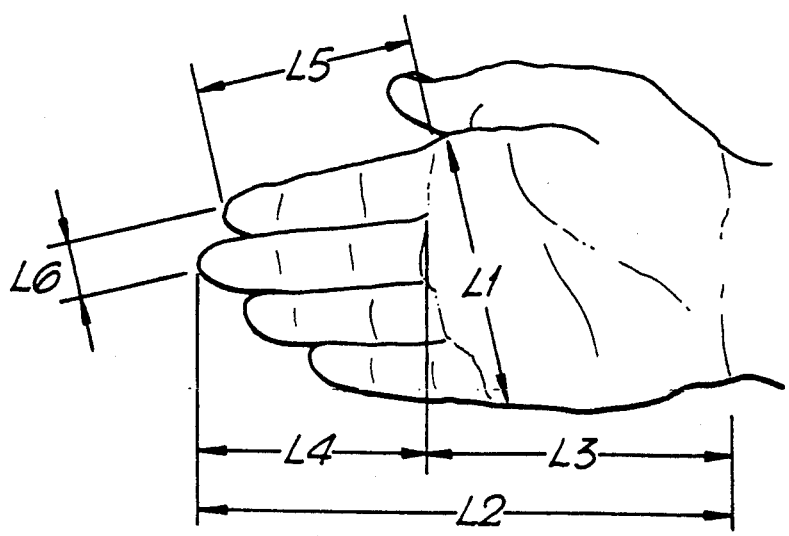
FIG. 6 illustrates the dimensions of a human hand used in Table 2.

The actual length and spacing of the buttons are determined by an analysis of anthropometric hand data, as set out in Table 1 for the British population. The two extremes are taken to be the 5th percentile female hand and the 95th percentile male hand. The length of the buttons accommodates the range of finger lengths; the forward divergence and tapering of the buttons accommodates the range of finger spacing, with longer fingers tending to be thicker and further apart; and the forward offset of the centre button corresponds to the universally longer middle finger. The dimensions of the human hand referred to in Table 1 are indicated in FIG. 6.

TABLE 1

| DIMENSION | FEMALE | | | MALE | | |
|---|---|---|---|---|---|---|
| | 5% | 50% | 95% | 5% | 50% | 95% |
| L1 Hand breadth | 69 | 76 | 83 | 78 | 87 | 95 |
| L2 Hand length | 159 | 174 | 198 | 173 | 189 | 205 |
| L3 Palm length | 89 | 97 | 105 | 98 | 107 | 116 |
| L4 Middle finger | 70 | 77 | 84 | 75 | 82 | 89 |
| L5 Index finger | 60 | 67 | 74 | 64 | 72 | 79 |
| L6 Finger spacing | 18 | 20 | 22 | 20 | 23 | 25 |

Table 1 is adapted from "Ergonomics" by S. Pheasant BSI Publication pp 7317:1987.

Figure 5:
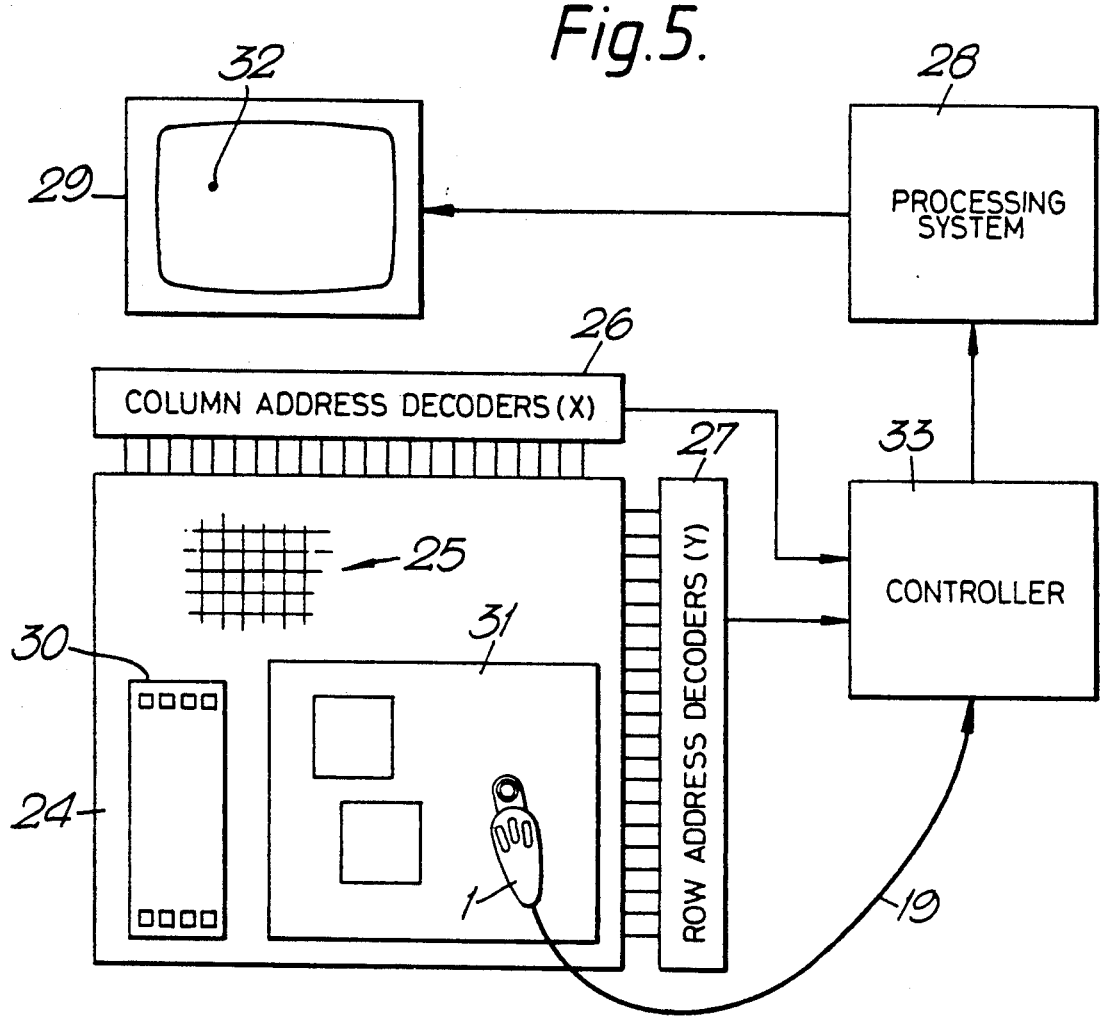
FIG. 5 is a schematic block diagram of an image processing system incorporating the device shown in FIGS. 1 to 4.

FIG. 5 illustrates an image processing system in which the device 1 is shown positioned on a digitising table 24. The digitising table supports two orthogonal arrays of electrical wires part of which are shown schematically at 25. The wire arrays define X and Y axes and each set of wires is connected to a respective address decoder 26, 27. The address decoders are connected to a controller 33 including a microprocessor and a number of memories. The controller 33 communicates with a processing system 28 by sending successive data packets, each containg X and Y coordinates and button flags, typically via an RS-232 serial line. Application software in the processing system 28 decodes these data packets, interprets them according to context, and controls the image on a display monitor 29.

A fixed menu 30 of commands is provided on the table 24 and the drawing also illustrates a page layout 31 positioned on the table 24.

In operation, the operator initially positions the graticule 13 at a suitable orientation, for example the position shown in FIG. 3, relative to the upper portion 2. He then slides the device 1 across the table 24 and carries out any of a number of operations. One example of an operation is to indicate to the processing system 28 the coordinates of the corners of the rectangular outline of the page layout 31. This is achieved by successively positioning the intersection 17 of the cross-hairs in the graticule 13 precisely over each corner and then depressing the button 21. The address decoders 26, 27 can determine from signals detected from electromagnetic coupling of the sense lines 25 with the pulsed current passing through the coil 16 which of the wires are closest to the centre of the cross-hairs 17 and communicate this information to the controller 33. The microcomputer within the controller 33 then causes each XY coordinate pair to be sent to the processing system 28 for storage.

In a second operation, the operator can select different functions for operation of the processing system from the menu 30, by positioning the cross-hairs over the relevant command and depressing the button 22. Once again, this causes the position of the centre 17 of the cross-hairs to be determined and since this was achieved using the button 22, a different button flag value is sent to the processing system 28. This indicates that those coordinates should be applied to a look-up table within the processing system 28 containing the address of a program segment, or subroutine, to be executed for the corresponding menu function.

In a third type of operation, the device 1 can be used to control the position of a graphic cursor 32 on the monitor screen. In this case, the operator might depress the button 23 to cause the processing system 28 to position the cursor 32 interactively at locations corresponding to the position of the cross-hair intersection 17 on the table 24.

It should be understood that although three particular operations have been described, many other operations are possible as with the conventional devices.

FIGS. 7-10 illustrate a second example of a position indicating device. This device comprises a body 40 which is pivoted to a support member 41, a leading end of which is provided with a graticule 42. The rear end of the support member 41 is provided with a number of control buttons 43. These control buttons are coupled via lines 19 to a controller 33 as in FIG. 5.

Figure 8:
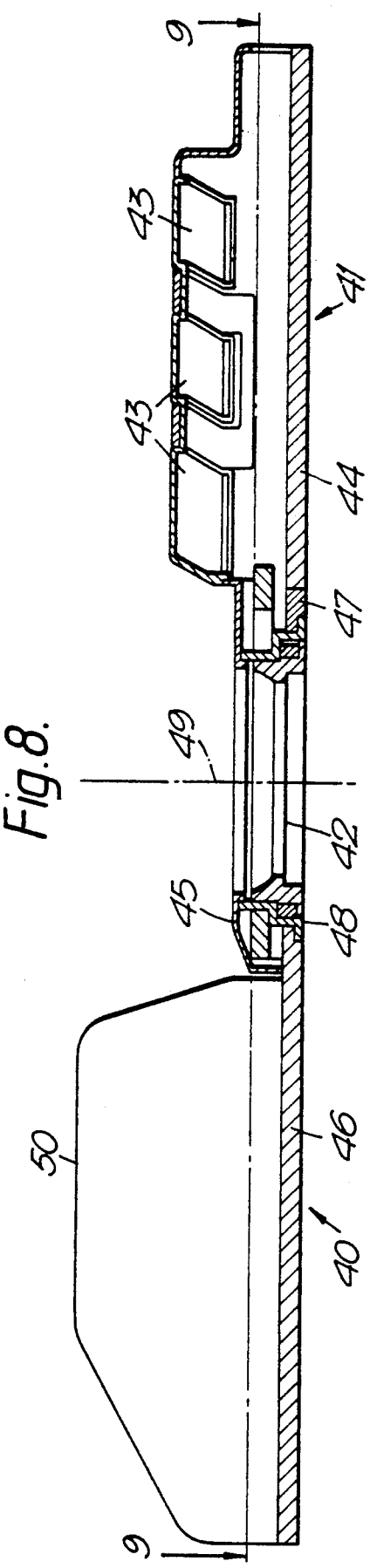
FIG. 8 is a cross-section through the device of FIG. 7.

As can be seen in FIG. 8, the support member 41 comprises a base 44 on which is supported the buttons 43 and which has an annular leading end section 45 which surrounds the graticule 42. The body portion 40 has a base 46 which has an annular leading end 47 which is pivoted to an annular flange 48 of the leading end 45 of the support member to enable the body portion 40 and the support member 41 to pivot relatively to one another about an axis 49 coincident with the centre of the graticule 42. The body portion 40 has an upper section 50 which is shaped to conform to the palm of a human hand.

Figure 9:
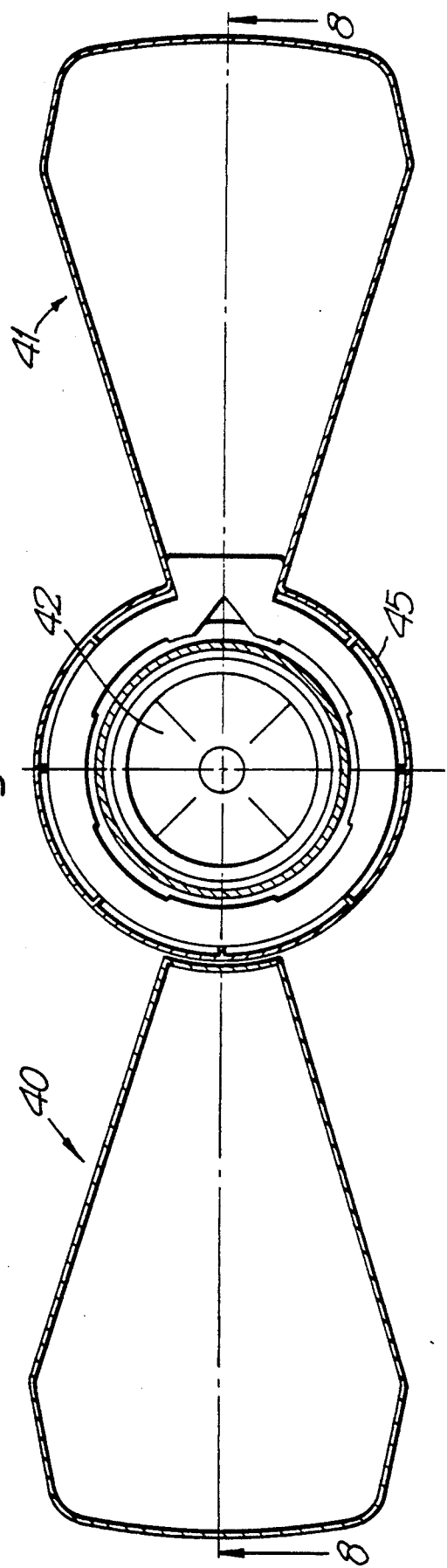
FIG. 9 is a section taken on the line 9—9 in FIG. 8.

FIG. 9 illustrates the device shown in FIG. 8 in longitudinal section.

Figure 7:
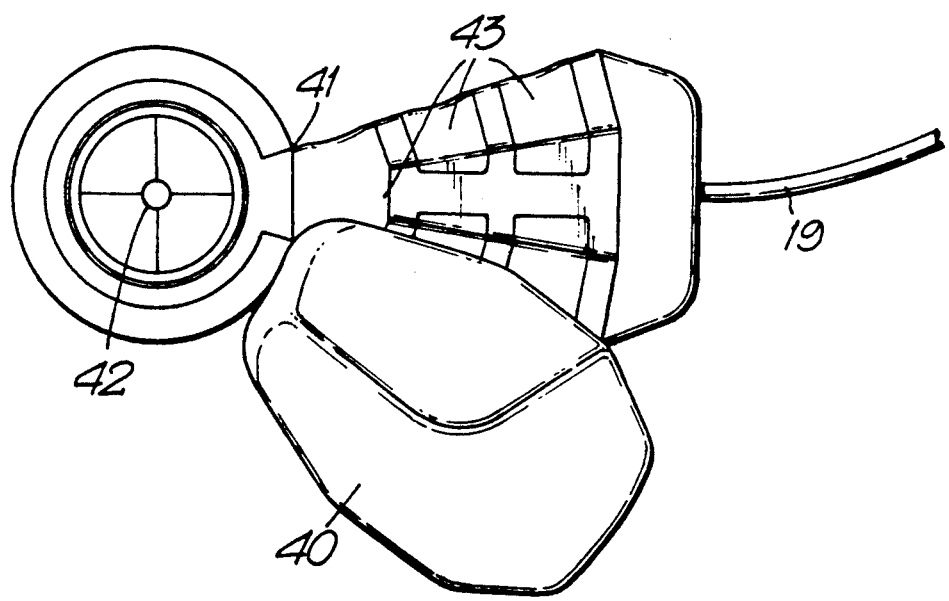
FIG. 7 is a perspective view of a second example of an indicating device.
Figure 10A:
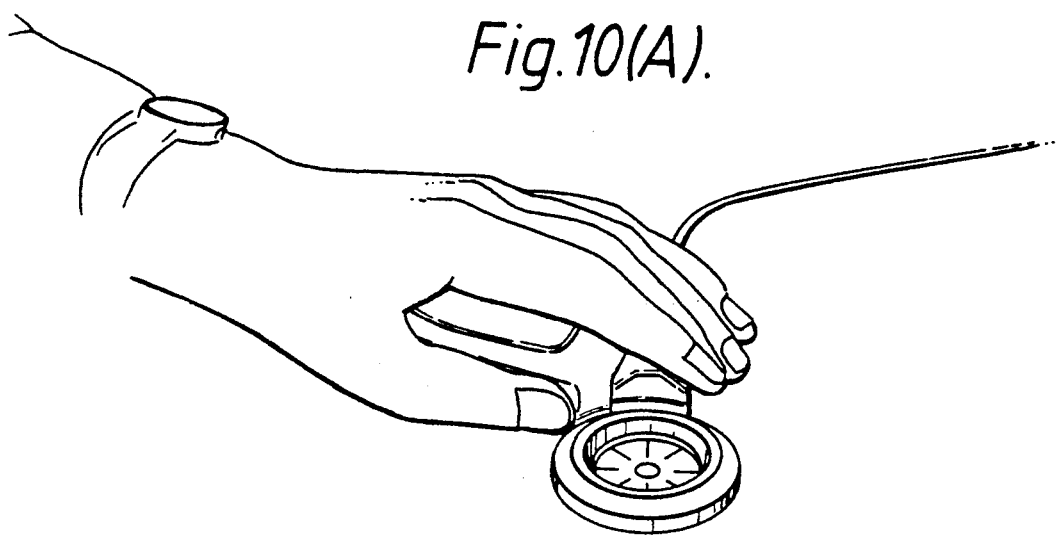
FIGS. 10A-10C illustrate the FIG. 7 device in different orientations.
Figure 10B:
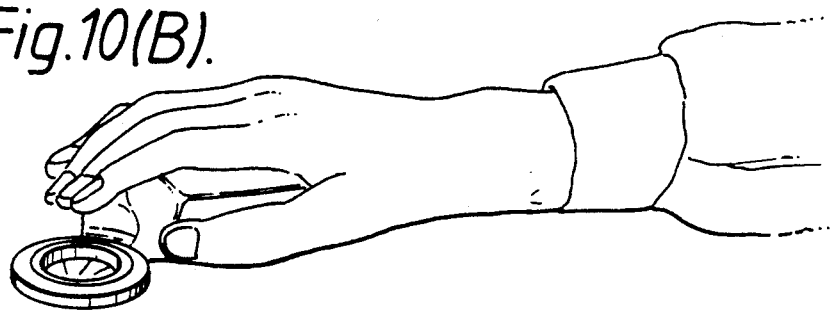
Figure 10C:
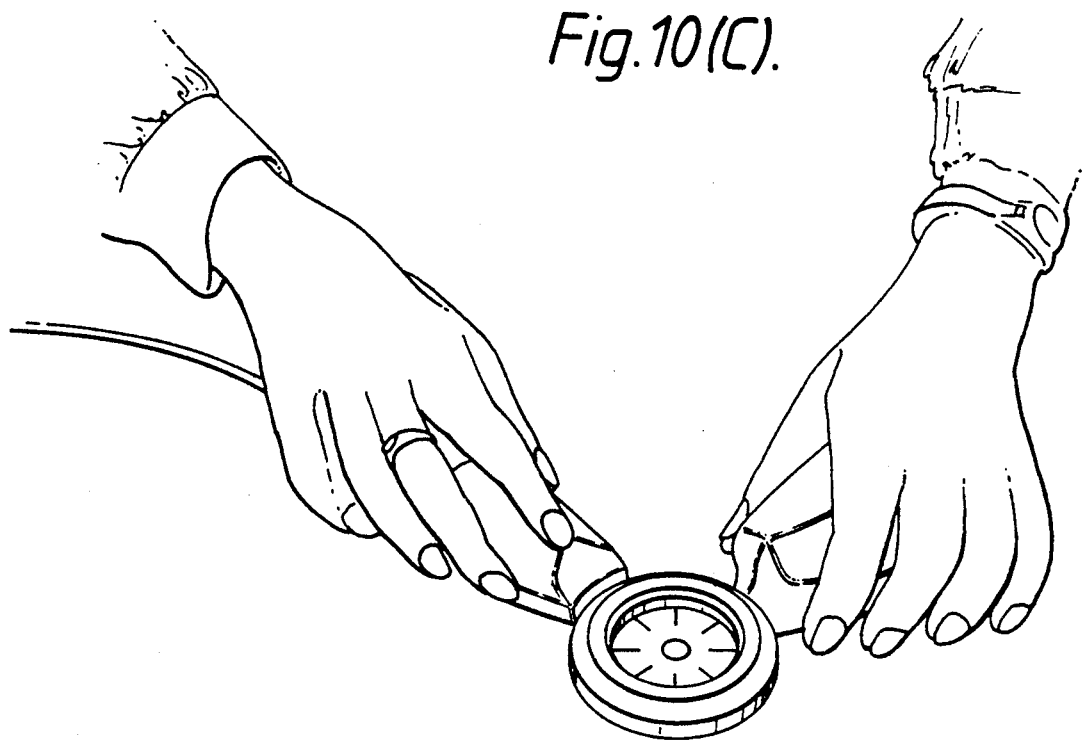

The device shown in FIGS. 7-9 can be used in a variety of ways depending upon the angular spacing between the body portion 40 and support member 41. Thus, as shown in FIGS. 10A and 10B if these two parts are relatively close together then the device can be manipulated using a single hand which extends over both the body portion 40 and the support member 41. Alternatively, the body portion 40 and support member 41 can be grasped by separate hands as shown in FIG. 10C.

We claim:

1. A manual position indicating device comprising a body portion that can be moved by hand across a surface; a support member movably mounted to said body portion, said support member including a graticule and associated signal generating or detecting means for interaction with position determining apparatus, whereby the relative positions of said graticule and said body portion are selected by suitably moving said support member and said body portion relatively to one another; and locking means for locking said support member relative to said body portion in a number of different positions.

2. A device according to claim 1, wherein support member is pivoted to said body portion so that it can swing to and fro in a lateral plane.

3. A device according to claim 1, wherein said locking means comprises a co-operating ball and notch system, said ball being coupled with said body portion while said notch system is mounted on said support member.

4. A device according to claim 1, wherein said signal generating or detecting means includes a switch, and wherein said body portion is provided with at least one control button for controlling said switch of said signal generating or detecting means.

5. A manual position indicating device according to claim 1 coupled with position determining apparatus with which it cooperates to determine the position of said graticule; and processing means coupled with said device and said apparatus to which the determined position is communicated.

6. A manual position indicating device comprising a body portion having a rear portion defining a smoothly rounded surface on which the palm of an operator's hand rests, and a number of elongate control buttons mounted on said body portion for controlling operation of said device, said buttons being positioned forward of said rear portion of said body portion and being located and shaped so as to lie under respective fingers of the operator's hand, further comprising a support member movably mounted to said body portion, said support member including a graticule and associated signal generating or detecting means for interaction with position determining apparatus, whereby the relative positions of said graticule and said body portion are selected by suitably moving said support member and said body portion relatively to one another; and locking means for locking said support member relative to said body portion in a number of different positions.

7. A manual position indicating device according to claim 6 coupled with said position determining apparatus with which it cooperates to determine the position of said graticule; and processing means coupled with said device and said apparatus to which the determined position is communicated.

* * * * *